United States Patent
Carrig et al.

(10) Patent No.: US 6,826,584 B1
(45) Date of Patent: Nov. 30, 2004

(54) REFINEMENT OF INTERPOLATED SIGNALS

(75) Inventors: James J. Carrig, San Jose, CA (US); Marco Paniconi, Campbell, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 635 days.

(21) Appl. No.: 09/745,314

(22) Filed: Dec. 22, 2000

(51) Int. Cl.$^7$ .................. G06F 17/14; G06F 15/00; G06F 17/17

(52) U.S. Cl. .............. 708/400; 708/209; 708/313; 708/402

(58) Field of Search .............. 708/300–323, 708/290, 400–409; 382/232; 375/240.13

(56) References Cited

U.S. PATENT DOCUMENTS

| | | | | |
|---|---|---|---|---|
| 4,447,886 A | * | 5/1984 | Meeker | 708/400 |
| 5,253,192 A | * | 10/1993 | Tufts | 708/403 |
| 5,420,891 A | * | 5/1995 | Akansu | 708/319 |
| 5,561,424 A | * | 10/1996 | Norsworthy et al. | 708/306 |
| 5,585,802 A | * | 12/1996 | Cabler et al. | 708/313 |
| 6,208,671 B1 | * | 3/2001 | Paulos et al. | 708/313 |
| 6,256,347 B1 | * | 7/2001 | Yu et al. | 375/240.13 |
| 6,298,361 B1 | * | 10/2001 | Suzuki | 708/313 |
| 6,363,405 B1 | * | 3/2002 | Loginov | 708/270 |
| 6,421,464 B1 | * | 7/2002 | Tran et al. | 382/232 |

OTHER PUBLICATIONS

Kou–Hu et al., Compatible HDTV Coding for Broadhand ISDN, 1998, IEEE, pp. 0743–0749.*
Din–Yuen et al., Fast Implementation of MPEG Audio Coder Using Recursive Formula with Fast Discrete Cosine Transforms, 1996, IEEE, pp. 144–148.*
Peter et al., A General Formulation of Modulated Filter Banks, 1999, IEEE, pp. 986–1002.*
Remy et al., Downsampling versus Folding in the DCT Domain, 1996, IEEE, pp. 2887–2891.*

* cited by examiner

Primary Examiner—Kakali Chaki
Assistant Examiner—Chat Do
(74) Attorney, Agent, or Firm—Blakely, Sokoloff, Taylor & Zafman LLP

(57) ABSTRACT

A method including decimating a signal x using a filter f to obtain a decimated signal y, interpolating the decimated signal y to obtain a reconstructed signal z, determining a refinement factor s by decimating z and comparing decimated z to the decimated signal y, and determining an improved reconstructed signal r by using the refinement factor s, the filter f, and the reconstructed signal z is disclosed.

12 Claims, 4 Drawing Sheets

REFINEMENT OF INTERPOLATED SIGNALS

FIELD OF INVENTION

The invention is related to the field of signal reconstruction.

BACKGROUND OF THE INVENTION

In the field of signal compression, a signal is frequently decimated to a prescribed size and format prior to applying the compression standard. For example, the H.261 Standard is used in video conference systems that interface with a 484 line interlaced display, but the luminance channel input is assumed to be progressive scan data of size either 144 rows of 176 pixels or 288 rows of 352 pixels. A typical video coding system must first decimate the larger input image down to the size expected by the video coder and then the typical decoding equipment must reverse this operation for the display. Similar techniques are employed in systems based on the H.263, MPEG-1, MPEG-2, and other coding systems.

SUMMARY OF THE INVENTION

A method including decimating a signal x using a filter f to obtain a decimated signal y, interpolating the decimated signal y to obtain a reconstructed signal z, determining a refinement factor s by decimating z and comparing decimated z to the decimated signal y, and determining an improved reconstructed signal r by using the refinement factor s, the filter f, and the reconstructed signal z is disclosed.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

An interpolation refinement method is disclosed. The method may be applied to a signal that is decimated by a known filter and then later reconstructed by interpolation. The method exploits knowledge of the decimation filter to improve interpolation accuracy and is provably as good or better than the original interpolated vector in reducing the mean square reconstruction error.

The interpolation refinement method allows an interpolation device, with knowledge of the decimation device, to do a higher fidelity decoding that would otherwise be possible. The method may be applied to audio, video, or any other kind of signal data which is first decimated and later interpolated. For example, the method may be readily applied to any decimated signal for which the decimation points were determined by a non-overlapping decimation filter or filter bank.

In one embodiment of a method for refinement of interpolated signals, the data is first interpolated by any method selected by the interpolation device and then improved such that the decimation constraints are preserved. The improved signal is as good or better than the original estimate regardless of how that original estimate was obtained, as shown in the mathematical proof below. The method can be used in conjunction with established interpolation methods to improve the interpolated signal.

Notation $A \in R^N$ indicates that A is a N-by-N matrix with real components $A_{i,j}$, $i,j \in \{0, 1, \ldots, N-1\}$. A superscript T, such as $A^T$ indicates transposition. The inverse of A is $A^{-1}$ and the inverse of the transposition of A is $A^{-T}$.

Refinement Procedure

Let $x \in R^n$ be a vector containing a subset of input data that is decimated as a unit; let $F \in R^{m \times n}$ be a filter which acts on x producing m outputs; and let $y = Fx \in R^m$ be those outputs. The vector y is a decimation point.

Assume that z is a first reconstruction of x. The reconstruction z may be obtained by a standard interpolation method applied to a set of local decimation points. Depending on the method of obtaining z, it is quite likely that $Fz \neq y$. That is, decimating z does not result in the known decimation point y. If this is true, then $r \in R^n$, an improved estimate of x which satisfies $Fr = y$, can be formed.

Figure 1:
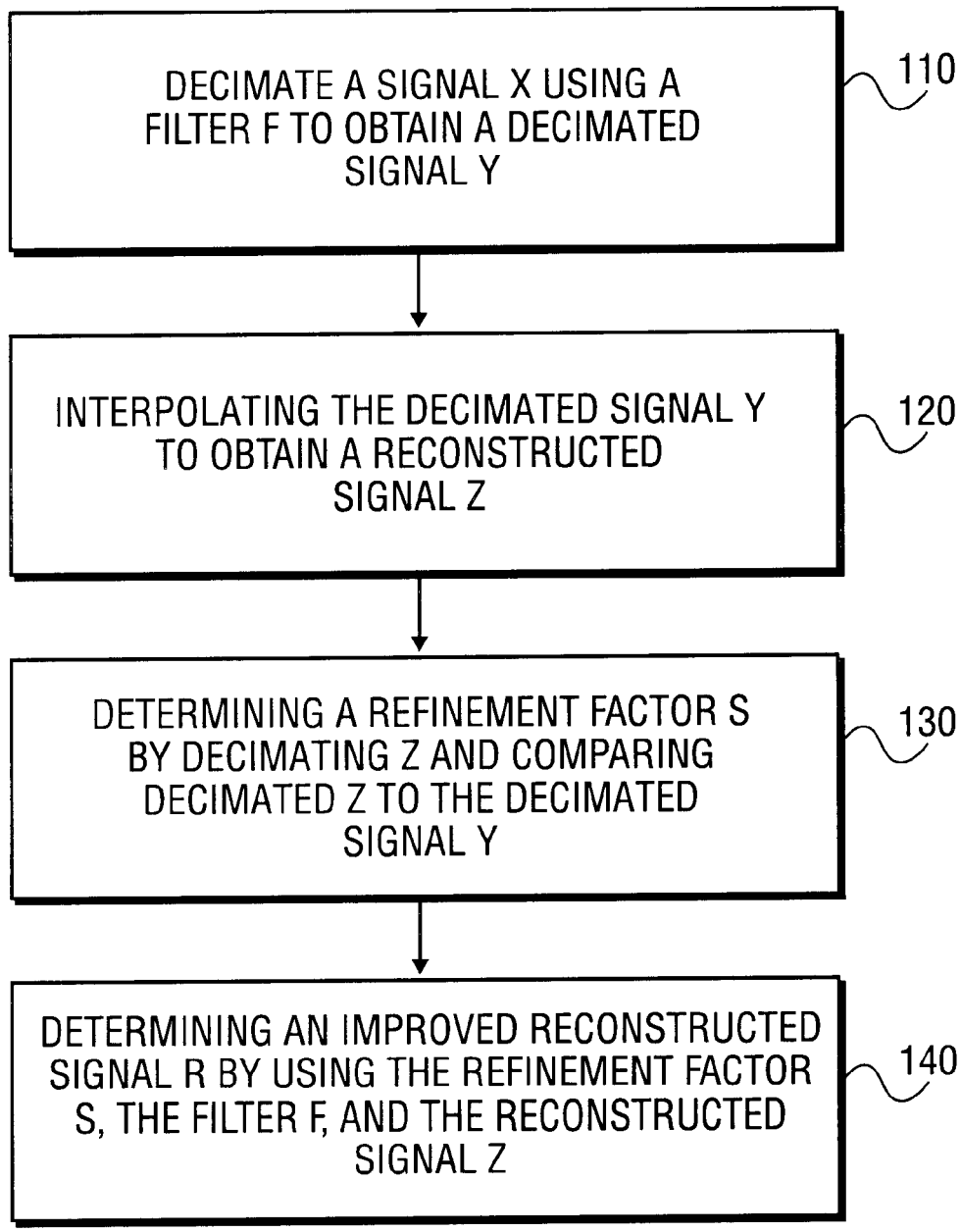
FIG. 1 shows an example of one embodiment of a method to refine interpolated signals.

FIG. 1 shows an embodiment of a method for refining an interpolated signal. A signal x is decimated using a filter f to obtain a decimated signal y, 110. The decimated signal y is interpolated to obtain a reconstructed signal z, 120. A refinement factor s is determined by decimating z and comparing decimated z to the decimated signal y, 130. An improved reconstructed signal r is determined by using the refinement factor s, the filter f, and the reconstructed signal z, 140.

The following theorem shows that the improved reconstructed signal r is closer to x in the mean squared error (MSE) sense than z is to x, whenever $Fz \neq y$ and is the same distance whenever $Fz = y$.

Theorem 1

Assume a signal $x \in R^n$, a decimation filter $F \in R^{m \times n}$, decimation points $y = Fx$, and a first reconstruction $z \in R^n$ are given. Determine an improved reconstruction $r = z + F^T s$, with s selected such that $(FF^T)s = y - Fz$. Then the improved reconstruction r satisfies $\|r-x\|^2 \leq \|z-x\|^2$ with equality if and only if $y = Fz$.

Proof:

$$\|r - x\|^2 = (r - x)^T (r - x) \tag{1}$$

$$= (z + F^T s - x)^T (z + F^T s - x) \tag{2}$$

$$= (z - x)^T (z - x) + 2(F^T s)^T (z - x) + (F^T s)^T (F^T s) \tag{3}$$

$$= (z - x)^T (x - x) + 2s^T (Fz - Fx) + s^T FF^T s \tag{4}$$

$$= (z - x)^T (x - x) + 2s^T (Fz - y) - s^T FF^T s \tag{5}$$

$$= (z - x)^T (x - x) + 2s^T (-FF^T s) + s^T FF^T s \tag{6}$$

$$= (z - x)^T (x - x) - s^T FF^T s \tag{7}$$

$$= \|z - x\|^2 - \|F^T s\|^2 \tag{8}$$

Therefore $\|r-x\|^2 \leq \|z-X\|^2$ with equality if and only if $\|F^T s\|^2 = 0$. The selection of s assures us that $\|F^T s\|^2 = 0$ only when $y = Fz$.

Generally, cases where $m < n$, which implies that the number of decimation points is fewer than the number of original data points, can be improved with the method. In some applications, $FF^T$ is invertible, and so s is computable by a simple matrix-vector multiplication. This happens, for instance, whenever F describes a many-to-one decimation (as will be illustrated in Example 1), or when F is formed from orthonormal columns (as will be illustrated in Example 2).

Example 1

Consider the following example to illustrate an improvement to an interpolated signal using the refinement procedure. In this example, an 8-bit signal is decimated by averaging sets of consecutive values. The first reconstruction estimate is obtained by linear interpolation of the decimated signal everywhere except at the end points. The interpolation at the end points is taken to be equal to the nearest value of the decimated signal.

The column labeled "x" in Table 1 shows an original 8-bit sequence decimated using the averaging filter to form the resulting decimation sequence labeled "y." Since there are two inputs for every output, n=2, m=1, and the filter F takes the form $$F = [0.5\ 0.5]$$

For example, values at times 1 and 2 (equal to 240 and 208) are replaced with the average value of 224. Since this is the average of samples at times 1 and 2, the average is assigned the time 1.5. Using matrix notation, this may be written as $$y_{1.5} = Fx = [0.5\ 0.5]\begin{bmatrix} x_1 \\ x_2 \end{bmatrix} [0.5\ 0.5]\begin{bmatrix} 240 \\ 208 \end{bmatrix} = 224$$

where subscripts denote the time associated with the sample.

Linear interpolation is formed on the values in column "y" to form the first interpolation in column "z." For example, $$z_2 = y_{1.5} + \frac{2 - 1.5}{3.5 - 1.5}(y_{3.5} - y_{1.5})$$

$$= 224 + \frac{2 - 1.5}{3.5 - 1.5}(160 - 224)$$

$$= 208$$

$$z_3 = y_{1.5} + \frac{3 - 1.5}{3.5 - 1.5}(y_{3.5} - y_{1.5})$$

$$= 224 + \frac{3 - 1.5}{3.5 - 1.5}(160 - 224)$$

$$= 176$$

where subscripts again denote the time associated with the sample.

The refinement procedure is then used to make sure that decimation of the interpolation sequence yields the same sequence that was obtained by decimating the original sequence. For example, at times 5 and 6 the first interpolation has values $z_5 = 100$ and $z_6 = 94$, but we know that the average of the original values at times 5 and 6 is equal to 80 and thus our estimates are too high. The refinement begins by computing s to satisfy $$(FF^T)s = y - Fz$$

In this case, $(FF^T)=0.5$ and so $$s = 2(y - Fz)$$

Using the values at times 5 and 6, we obtain $$s = 2\left(80 - [0.5\ 0.5]\begin{bmatrix} 100 \\ 94 \end{bmatrix}\right) = -34$$

Figure 2:
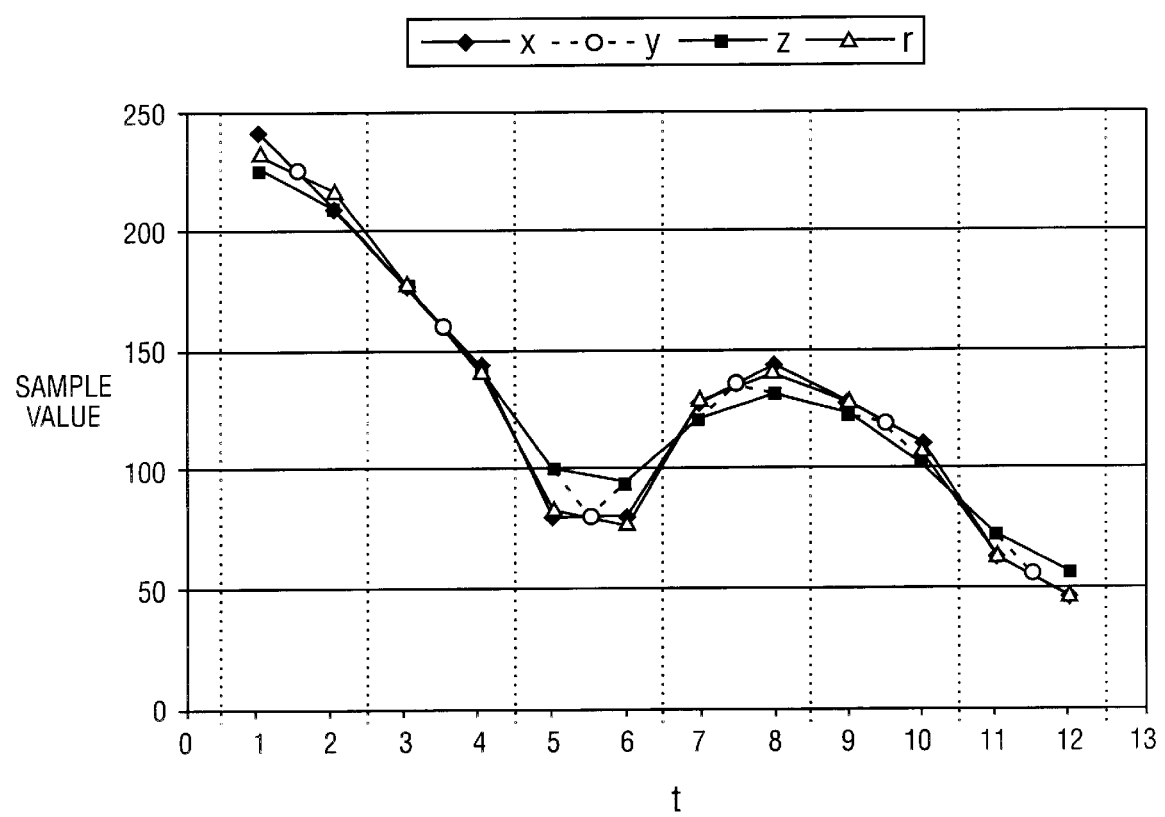
FIG. 2 shows an example of an interpolated signal that is refined using the method of FIG. 1.

Thus the improved values are calculated as $$r = z + F^T s = \begin{bmatrix} 100 \\ 94 \end{bmatrix} + \begin{bmatrix} 0.5 \\ 0.5 \end{bmatrix}(-34) = \begin{bmatrix} 83 \\ 77 \end{bmatrix}$$

which has the desired average value of 80. Table 1 contains a complete listing of calculated values and FIG. 2 shows the same data graphically. In this example, the square error is reduced from $$\|z - x\|^2 = 1{,}256$$

to $$\|z - x\|^2 = 180$$

which corresponds to a PSNR improvement from 27.9 dB to 36.4 dB.

TABLE 1

An example where the refinement procedures is used to improve upon linear interpolation.
Here, the PSNR improves from 27.9 dB to 36.4 dB.

| Original sequence | | Decimated sequence | | First interpolation | | Refined interpolation | |
| --- | --- | --- | --- | --- | --- | --- | --- |
| t | x | t | y | t | z | t | r |
| 1 | 240 |  |  | 1 | 224 | 1 | 232 |
| 2 | 208 | 1.5 | 224 | 2 | 208 | 2 | 216 |
| 3 | 176 |  |  | 3 | 176 | 3 | 178 |
| 4 | 144 | 3.5 | 160 | 4 | 140 | 4 | 142 |
| 5 | 80 |  |  | 5 | 100 | 5 | 83 |
| 6 | 80 | 5.5 | 80 | 6 | 94 | 6 | 77 |
| 7 | 128 |  |  | 7 | 122 | 7 | 131 |
| 8 | 144 | 7.5 | 136 | 8 | 132 | 8 | 141 |
| 9 | 128 |  |  | 9 | 124 | 9 | 130 |
| 10 | 112 | 9.5 | 120 | 10 | 104 | 10 | 110 |
| 11 | 64 |  |  | 11 | 72 | 11 | 64 |
| 12 | 48 | 11.5 | 56 | 12 | 56 | 12 | 48 |

Example 2

Reconsider the previous example using a truncated (4 input, 2 output) DCT as the decimation scheme. Interpolation is an inverse DCT (the missing high frequencies are assumed to be zero) followed by boundary smoothing and the refinement procedure. Mathematically, the decimation filter may be written as:

$$F = \begin{bmatrix} 0.50000 & 0.50000 & 0.50000 & 0.50000 \\ 0.65328 & 0.27060 & -0.27060 & -0.65328 \end{bmatrix}$$

Table 2 lists the input signal x and the corresponding decimation points y, each of which is a two-element vector. For example, the first point is calculated as $$y_{2,5} = \begin{bmatrix} 0.50000 & 0.50000 & 0.50000 & 0.50000 \\ 0.65328 & 0.27060 & -0.27060 & -0.65328 \end{bmatrix} \begin{bmatrix} 240 \\ 208 \\ 176 \\ 144 \end{bmatrix} = \begin{bmatrix} 384.000 \\ 71.374 \end{bmatrix}$$

Inverse-DCT interpolation is achieved by computing $z=F^T y$ for each set of input and output points. For example, $$\begin{bmatrix} z_1 \\ z_2 \\ z_3 \\ z_4 \end{bmatrix} = \begin{bmatrix} 0.50000 & 0.65328 \\ 0.50000 & 0.27060 \\ 0.50000 & -0.27060 \\ 0.50000 & -0.65328 \end{bmatrix} \begin{bmatrix} 384.000 \\ 71.374 \end{bmatrix} = \begin{bmatrix} 238.627 \\ 211.314 \\ 172.686 \\ 145.373 \end{bmatrix}$$

which matches the listing in Table 2.

In this example, if the refinement method is applied to z directly, there would be no improvement. This can be seen as follows. Since $FF^T=I$, and $z=F^T y$ we have $s=y-Fz=y-FF^T y=0$ which implies that $r=z$. The solution to this problem is to not select $z=F^T y$. Additional reasons for an alternate selection are explained below and justified by the final results.

A sequence z', to which the refinement procedure is applied, is determined. DCT decimation and interpolation methods may suffer blocking effects at the boundaries. To minimize these blocking effects, a smoothing filter to recalculate the boundary data ($z_4$, $z_5$, $z_8$, $z_9$) is applied. For example, a simple 3-point moving average filter is used, and the resulting vector is called z'. Non-boundary elements are simply copied from the sequence z. For example, z' is calculated as $$z'_4 = [\,1/3 \;\; 1/3 \;\; 1/3\,] \begin{bmatrix} 172.686 \\ 145.373 \\ 72.201 \end{bmatrix} = 130.090$$

A side effect of the smoothing is that decimating the new sequence no longer produces the sequence y, and, the mean-square-error increases. Specifically, the square error rose from $$\|z-x\|^2 = 381$$

to $$\|z'-x\|^2 = 1{,}197.$$

The refinement procedure is applied to improve the smoothed estimate. As noted previously, $FF^T=I$ and so $s=y-Fz'$ and $$r=z'+F^T s=z'+F^T(y-F\,z')$$

Figure 3:
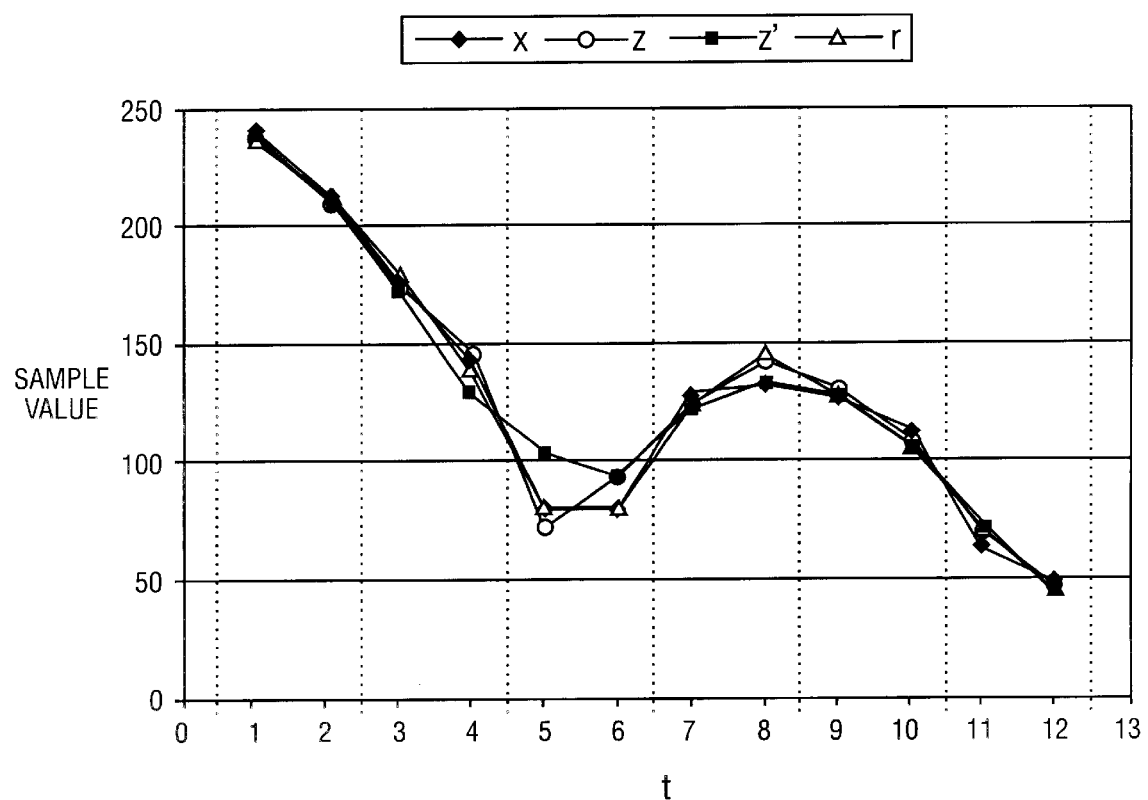
FIG. 3 shows another example of an interpolated signal that is refined using the method of FIG. 1.

The complete results of this computation are given in Table 2 below and displayed graphically in FIG. 3. Note that the square error has now decreased to $$\|r'-x\|^2 = 148$$

offering a significant reduction over the previous estimates. The corresponding reconstruction PSNR measurements are 33.1 dB for the inverse DCT signal, 28.1 dB for the smoothed signal, and 37.2 dB for the refined signal.

TABLE 2

An example where the refinement procedure is used to improve upon smoothed DCT interpolation. In this example, the PSNR improves from 28.1 dB for z' to 37.2 dB for r.

| Original sequence | | Decimated sequence | | Inverse DCT | | Smoothed DCT | | Refined interpolation | |
|---|---|---|---|---|---|---|---|---|---|
| t | x | t | y | t | z | t | z' | t | r |
| 1 | 240 |  |  | 1 | 238.627 | 1 | 238.627 | 1 | 235.925 |
| 2 | 208 |  | 384.000 | 2 | 211.314 | 2 | 211.314 | 2 | 212.433 |
| 3 | 176 | 2.5 | 71.374 | 3 | 172.686 | 3 | 172.686 | 3 | 179.210 |
| 4 | 144 |  |  | 4 | 145.373 | 4 | 130.087 | 4 | 140.432 |
| 5 | 80 |  |  | 5 | 72.201 | 5 | 103.582 | 5 | 80.332 |
| 6 | 80 |  | 216.000 | 6 | 93.172 | 6 | 93.172 | 6 | 80.612 |
| 7 | 128 | 6.5 | -54.799 | 7 | 122.828 | 7 | 122.828 | 7 | 125.388 |
| 8 | 144 |  |  | 8 | 143.799 | 8 | 132.418 | 8 | 145.668 |
| 9 | 128 |  |  | 9 | 130.627 | 9 | 126.694 | 9 | 129.356 |
| 10 | 112 |  | 176.000 | 10 | 105.657 | 10 | 105.657 | 10 | 107.335 |
| 11 | 64 | 10.5 | 65.251 | 11 | 70.343 | 11 | 70.343 | 11 | 70.631 |
| 12 | 48 |  |  | 12 | 45.373 | 12 | 45.373 | 12 | 44.677 |

Figure 4:
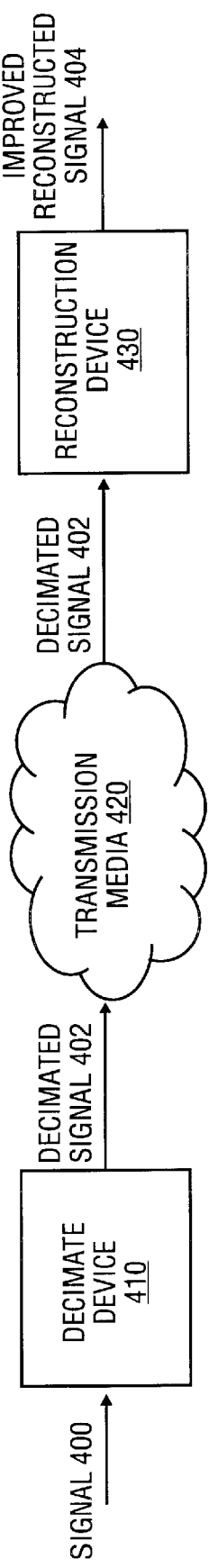
FIG. 4 shows an example of one embodiment of an apparatus to refine interpolated signals.

The signal decimating, interpolating, and reconstruction are performed by the paratus illustrated in FIG. 4. Signal 400 is input into decimation device 410. Decimation device 410 follows a decimation algorithm to decimate signal 400 using a decimation filter and to output a decimated signal 402 for transmission along transmission media 420. The decimated signal 402 is transmitted to reconstruction device 430. The reconstruction device receives the decimated signal and interpolates the decimated signal to obtain a reconstructed signal. The reconstruction device determines a refinement factor, and determines an improved reconstructed signal by using the refinement factor, the decimation filter, and the reconstructed signal. The reconstruction device outputs an improved reconstructed signal 404.

The decimation device 410 and the reconstruction device 430 can be implemented in a variety of ways to perform the decimation and reconstruction functions. In one embodiment, decimation device 410 and reconstruction device 430 are embodied as software stored on computer readable media and executed by a general purpose or specifically configured computer system. The computer system may include a central processing unit, a computer memory, and one or more input/output devices and co-processors. Alternatively, the decimation device 410 and reconstruction device 430 may be implemented as hardware logic circuits to perform these functions. In addition, decimation device 410 and reconstruction device 430 can be implemented as a combination of hardware, software, or firmware.

These and other embodiments of the present invention may be realized in accordance with these teachings and it should be evident that various modifications and changes may be made in these teachings without departing from the broader spirit and scope of the invention. The specification and drawings are, accordingly, to be regarded in an illustrative rather than restrictive sense and the invention measured only in terms of the claims.

What is claimed is:

1. A method comprising:
   decimating a signal x using a filter F to obtain a decimated signal y;
   interpolating the decimated signal y to obtain a reconstructed signal z;
   determining a refinement factor s by decimating z and comparing decimated z to the decimated signal y, wherein determining the refinement factor s comprises selecting a value for s that satisfies $$(FF^T)s=y-Fz;$$

where $F^T$ is the transposed decimation filter; and determining an improved reconstructed signal r by using the refinement factor s, the transposed decimation filter $F^T$, and the reconstructed signal z.

2. The method of claim 1, wherein decimating the signal x comprises selecting values for y that satisfy $$y=Fx.$$

3. The method of claim 1, wherein determining the improved reconstructed signal comprises selecting values for r that satisfy $$r=z+F^Ts.$$

4. The method of claim 1, wherein the signal x is decimated using a discrete cosine transform (DCT) filter, and the decimated signal y is interpolated using an inverse DCT filter.

5. An apparatus comprising:

means for decimating a signal x using a filter F to obtain a decimated signal y;

means for interpolating the decimated signal y to obtain a reconstructed signal z;

means for determining a refinement factor s by decimating z and comparing decimated z to the decimated signal y; wherein said means for determining the refinement factor s comprises means for selecting a value for s that satisfies $$(FF^T)s=y-Fz;$$

where $F^T$ is the transposed decimation filter; and means for determining an improved reconstructed signal r by using the refinement factor s, the transposed decimation filter $F^T$, and the reconstructed signal z.

6. The apparatus of claim 5, wherein said means for decimating the signal x comprises means for selecting values for y that satisfy $$y=Fx.$$

7. The apparatus of claim 5, wherein said means for determining the improved reconstructed signal comprises means for selecting values for r that satisfy $$r=z+F^Ts.$$

8. The apparatus of claim 5, wherein the signal x is decimated using a discrete cosine transform (DCT) filter, and the decimated signal y is interpolated using an inverse DCT filter.

9. A computer readable medium having instructions which, when executed by a processing system, cause the system to:

decimate a signal x using a filter F to obtain a decimated signal y;

interpolate the decimated signal y to obtain a reconstructed signal z;

determine a refinement factor s by decimating z and comparing decimated z to the decimated signal y, wherein determining the refinement factor s comprises selecting a value for s that satisfies $$(FF^T)=y-Fz;$$

where $F^T$ is the transposed decimation filter; and determine an improved reconstructed signal r by using the refinement factor s, the transposed decimation filter $F^T$ and the reconstructed signal z.

10. The medium of claim 9, wherein the executed instructions further cause the system to:

decimate the signal x by selecting values for y that satisfy $$y=Fx.$$

11. The medium of claim 10, wherein the executed instructions further cause the system to:

determine an improved reconstructed signal r by selecting values for r that satisfy $$r=z+F^Ts.$$

12. The medium of claim 10, wherein the signal x is decimated using a discrete cosine transform (DCT) filter, and the decimated signal y is interpolated using and inverse DCT filter.

* * * * *